United States Patent

Stobbe

[11] Patent Number: 5,999,099
[45] Date of Patent: Dec. 7, 1999

[54] ROLLING TRUCK WITH A TRANSPONDER

[76] Inventor: Anatoli Stobbe, Steinradweg 3, D-30890 Barsinghausen, Germany

[21] Appl. No.: 09/120,151

[22] Filed: Jul. 21, 1998

[30] Foreign Application Priority Data

Jul. 29, 1997 [DE] Germany ............... 197 32 597

[51] Int. Cl.⁶ .................................................. G08B 13/181
[52] U.S. Cl. ............... 340/572.8; 280/79.2; 280/79.5; 340/425.5; 340/572.1; 340/825.3; 340/825.54
[58] Field of Search ............... 340/572.8, 572.1, 340/825.54, 825.3, 425.5; 280/79.2, 79.5

[56] References Cited

U.S. PATENT DOCUMENTS

| | | | |
|---|---|---|---|
| 5,505,473 | 4/1996 | Radcliffe | 280/79.2 |
| 5,519,381 | 5/1996 | Marsh et al. | 340/572.4 |
| 5,767,765 | 6/1998 | Shoup | 340/425.5 |

*Primary Examiner*—Glen Swann
*Attorney, Agent, or Firm*—Collard & Roe, PC

[57] ABSTRACT

A rolling truck consisting of a metal container on whose bottom are provided castors and at least one brake gear, where the bottom has a contact area between the castors on the opposite sides for placing the rolling truck on a conveyor belt. A transponder is arranged on the bottom of the rolling truck, and the transponder is mounted on a plastic spacer at a distance from the bottom of the rolling truck, and outside the contact area of the bottom of the rolling truck. This reduces the distance between the transponder and the floor where the antenna of an RF reader is installed, and thus reduces the size and power required for the transponder.

14 Claims, 3 Drawing Sheets

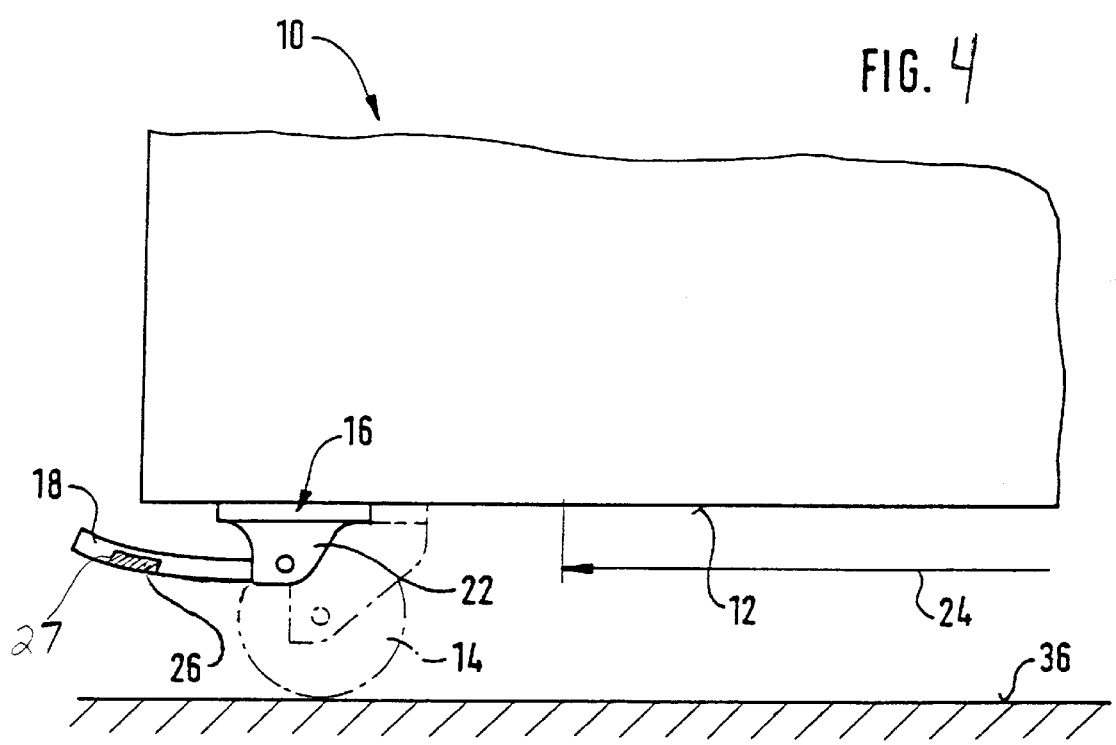

ROLLING TRUCK WITH A TRANSPONDER

BACKGROUND OF THE INVENTION

1. Field of the Invention

The invention relates to a rolling truck equipped with a transponder for easy identification.

2. Description of the Prior Art

Rolling trucks serve as transport containers and are commonly known as "catering trolleys". They are useful for serving food and beverages to passengers on airplanes. The rolling trucks have a sturdy design and have a container to accommodate the provisions. Normally, the entire container is constructed out of metal, especially the bottom of the container. Castors are located on the front and rear of the bottom side to make it easier to move the rolling truck. Furthermore, the rolling trucks are equipped with a brake gear to lock the castors in place and prevent the container from rolling. The brake gear is engaged when foods or beverages are removed from the container and given to a passenger.

Known rolling trucks have a transponder located at the bottom of the rolling truck. The transponder is equipped with a memory device capable of receiving and transmitting data. The memory holds data assigned to the respective rolling truck and is used in identifying the trucks. The transponder usually does not have its own power source. Instead, it receives the power required for operation from the high-frequency field of a reader as soon as the transponder enters the area of influence of this reader.

When an airplane lands at an airport with rolling trucks, the rolling trucks are unloaded from the airplane, cleaned, washed, and inspected. The inspection determines whether the respective rolling truck can be reused directly, or if repair work will be necessary.

If the rolling truck passes the inspection, the washed rolling truck is transferred to a collecting zone where it is filled with new provisions. If the rolling truck fails the inspection, it is sent to a repair area for repairs. After being repaired, the rolling truck is sent to the collecting zone. In the event repairs are no longer possible, the rolling truck will be put out of service as scrap.

The process thus described can be explained with respect to transponders assigned to each rolling truck. At those places where the rolling trucks enter or leave the areas or zones described above, a coil or inductor of a reader is provided in the floor to act as an antenna. When a rolling truck passes over the reader, a wireless data exchange takes place automatically between the transponder and the reader. It is therefore possible to detect the respective location of each transponder using a centrally located system that is connected to all of the readers. If a rolling truck is being repaired, the type of repair can be entered into the transponders memory. This makes it possible to ascertain, at any point in time, how often a given rolling truck has been repaired and what specific types of repairs have been involved. Analysis of the corresponding data also makes it possible to determine which areas of the rolling trucks are particularly likely to need repairs and consequently where improvements are needed.

If a rolling truck is lost, it is possible, with the help of the system described here, to ascertain the most recent location of the transponder. In addition to the possibilities described, there are many other cases which make it advantageous to use a transponder on a rolling truck.

When a transponder and a reader are used, it is important to keep the distance between the antenna of the reader and the transponder to a minimum, so that enough energy is transmitted to the transponder coil, and data sent by the transponder can be received. With the known rolling trucks, the transponder is located in the floor of the metal container, and the distance between the bottom of the container and the floor is determined by the castors on the rolling truck. The distance is approximately 10 cm.

The outside dimensions of a transponder are determined mainly by the coil used for the inductive transmission. The coil size therefore limits the amount of miniaturization possible. In addition, the bottom of the rolling truck is typically made out of metal. A metal floor greatly reduces the transmitting and receiving power of the transponder due to the absorption of some of the HF energy.

In order to ensure reliable transmission of data between the reader and transponder, due to the above factors, comparatively large transponders with large coils are necessary. The typical dimensions of a transponder housing are approximately 10 mm high, 27 mm wide, and 67 mm long.

The following should be taken into account with regard to the arrangement of the transponder on the bottom of the rolling truck. When the rolling trucks are automatically washed or transferred to the collecting zone, or filled with new provisions, the rolling trucks are placed on conveyor belts which convey the rolling trucks to the individual stations. The bottom of the rolling truck is then in direct contact with the conveyor belt. The area in which the bottom of the rolling truck contacts the conveyor belt is known as the contact area. This contact area must be absolutely smooth, as it is subject to stresses due to the conveyor belt and the weight of the rolling truck. With the known rolling trucks, the transponder is embedded inside the contact area in a recess in the bottom surface of the truck to provide a smooth surface, and to protect the transponder.

One disadvantage of the known rolling trucks is that the transponder must have a large coil because of the comparatively great distance from the floor and the reader in the floor. This not only increases the dimensions on the whole, but also increases the price of the transponder. One result of the large dimensions of the transponder is that the transponder must be arranged inside the contact area.

Additional costs are incurred because the transponder is located in the contact area of the bottom of the rolling truck. First the bottom of the truck must be specially designed in this area to protect the transponder from the conveyor belt. Finally, the power of the reader must also be high because of the predetermined distance between the transponder and the antenna of the reader installed in the floor.

SUMMARY OF THE INVENTION

It is therefore an object of the present invention to design the rolling truck, a transponder and a reader having reliable data transmission between the transponder and the reader and at a minimal cost.

It is another object of the present invention is to place the transponder on a spacer made of plastic, not on the bottom of the rolling truck, but at a distance from the bottom, and outside the contact area of the bottom of the rolling truck.

It is a further object of the invention to minimize the dimensions of the transponder and position it within the small zone remaining outside the contact area of the bottom of the rolling truck.

In the invention, the transponder is mounted on a spacer at a distance from the bottom of the rolling truck, the distance between the transponder or its coil and the floor is much smaller. Therefore, a reliable data transmission between the transponder and the reader can be achieved with much less energy. As a result, a smaller coil can be selected for the transponder, and the dimensions of the transponder are also correspondingly smaller. Finally, the reader need not be designed to be as powerful, and both factors together lead to cost advantages.

To overcome the disadvantage of the prior art, the transponder is located at a distance from the metal bottom of the rolling truck, thereby greatly reducing the absorption of HF energy by the metal bottom, and lowering the required transponder HF power level. The small distance from the floor and the distance from the metal bottom of the rolling truck created by the spacer permits the design and use of small transponders and energy-efficient readers. Since the transponder is located outside the contact area of the bottom of the rolling truck, the rolling truck can be placed on a conveyor belt without requiring a special design of the contact area.

In a preferred embodiment of the invention, the spacer itself is mounted on the bottom of the rolling truck outside the contact area.

In an additional embodiment, the transponder is attached, with the spacer, to the metal brake gear of the rolling truck. In this case, the brake gear becomes a part of the spacer because the brake mechanism extends downward away from the bottom of the rolling truck.

In an additional preferred embodiment, the transponder can be arranged either on a pedal of the brake gear, or on the brake gear mount.

In another preferred embodiment of the invention, the brake gear itself is made of plastic, and also forms the spacer for the transponder which is mounted either on a pedal of the plastic brake gear, or on the brake gear mount.

According to another embodiment of the invention, the transponder is designed as a small round disk, with the diameter being approximately 30 mm and the height approximately 10 mm. These dimensions are much smaller than the prior art.

The transponder comprises a plastic housing which is open on one side. The coil and other electric components of the transponder are inserted into the housing, and the housing is then filled and sealed with a casting compound from the open side.

According to another embodiment of the invention, the transponder housing is omitted, and an opening corresponding to the housing is provided in the plastic spacer itself or in the pedal or the mount for the plastic brake gear. The electric components and the transponder coil are arranged in this opening, and the opening is filled and sealed with a casting compound. Thus, the transponder is an integral part of the spacer or the brake gear.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 4 is a partial side view of a rolling truck according to another preferred embodiment of the invention.

DETAILED DESCRIPTION OF THE PREFERRED EMBODIMENT

Figure 1:
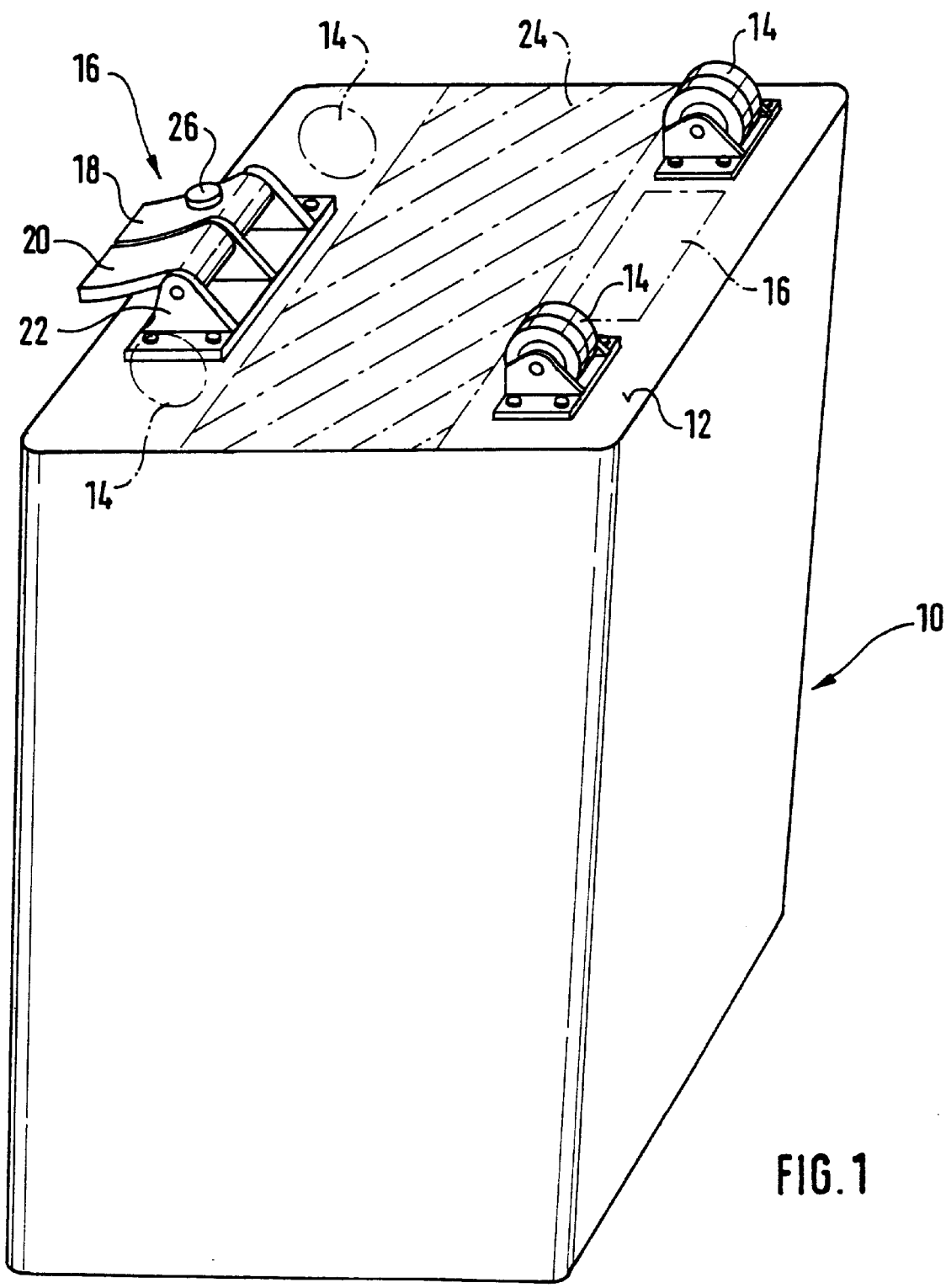
FIG. 1 is a perspective view of a rolling truck shown from below.

Referring to FIG. 1, there is shown a rolling truck 10 with a metal bottom 12 and castors 14, as viewed from below. The drawing shows only the two castors 14 on the right, whereas the castors 14 on the left are indicated only by dotted circles to make the drawing easier to read.

On each side of bottom 12 there is provided a brake gear 16. Only the left brake gear 16 is shown completely in FIG. 1, while the right brake gear is indicated by a dotted rectangle 16 to simplify the drawing. Brake gear 16 comprises two pedals 18 and 20 which are arranged on a mount 22, and can be operated by a foot. With operating pedal 18, castors 14 can be blocked by a mechanism, not shown in detail, whereas castors 14 can be released again by operating pedal 20.

The bottom surface 12 of rolling truck 10 has a contact area 24 which is indicated with hatching, and takes up most of the bottom area. Rolling truck 10 or the surface of bottom 12 contacts the conveyor belt with its contact area 24 when transported to a washing installation, or to a collecting zone. In the collecting zone, rolling truck 10 is filled with provisions. Castors 14 and brake gears 16 hang down on both sides of the conveyor belt and are outside contact area 24.

In the embodiment according to FIG. 1, brake gear 16 is made of plastic, and a transponder 26 is mounted on the side of pedal 18 facing away from bottom surface 12. Brake gear 16 thus serves as a spacer for transponder 26, which is not arranged in the plane of the bottom surface 12 but, spaced at a distance from it. Since the transponder is comparatively smaller, it is possible to arrange it outside contact area 24 of bottom surface 12.

Figure 2:
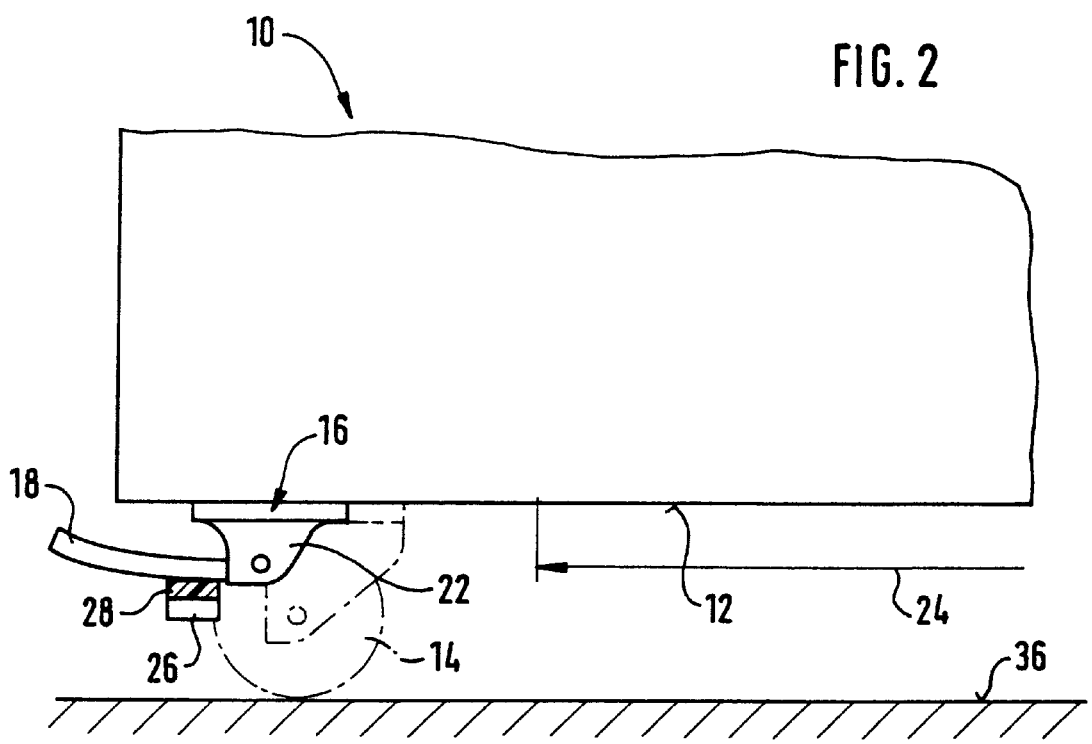
FIG. 2 is a partial side view of a rolling truck according to a preferred embodiment of the inventions.

Referring to FIG. 2, an additional embodiment of rolling truck 10 is shown, where brake gear 16 is made of metal in the usual way. As compared to FIG. 1, the transponder is mounted on metal pedal 18, by means of an intermediate part 28 made of plastic. In this embodiment, transponder 26 is again spaced at a distance from bottom surface 12 outside contact area 24, thus reducing the distance from transponder 26 to the floor 36 in which the antenna (not shown) of a reader is installed. Since the housing of transponder 26 is made of plastic, the intermediate part 28 may optionally be omitted. Transponder 26 is mounted on pedal 18, and is still spaced away from bottom surface 12 of rolling truck 10.

Figure 3:
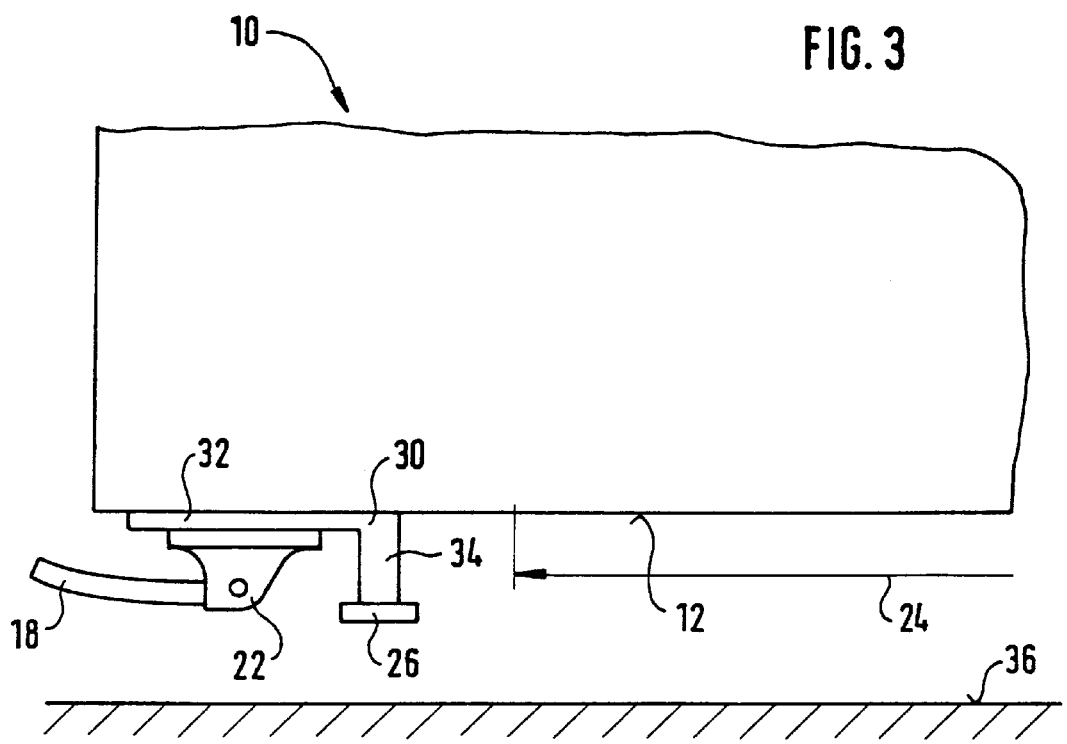
FIG. 3 is a partial side view of a rolling truck according to another preferred embodiment of the invention.

Referring to FIG. 3, there is shown another embodiment of the invention, where castors 14 are not shown to simplify the drawing. The plastic spacer is formed by an angle bracket 30 with a base leg 32 and a mounting leg 34 which extends away from bottom surface 12. With base leg 32, the spacer is mounted on bottom surface 12, and brake gear 16, made of plastic, is arranged on base leg 32. Transponder 26 is disposed on the lower end of mounting leg 34 and is thus spaced away from bottom surface 12 of rolling truck 10 and outside contact area 24.

It is also conceivable for angle bracket 30 to be integrated with brake gear 16 by designing the base leg as part of the brake gear and by having the mounting leg 34 extend directly down from brake gear 16.

Referring to FIG. 4, there is shown another embodiment of the invention, wherein the transponder housing is omitted. An opening 27, corresponding to the housing is provided in pedal 18 or plastic spacer 28 or mount 22 for the plastic brake gear. The electric components and the transponder coil are filled and sealed with a casting compound. Thus, transponder 26 is an integral part of spacer 28, brake gear 22 or pedal 18. Note, only the embodiment wherein the transponder is located in pedal 18 is shown.

Accordingly, while several embodiments of the present invention have been shown and described, it is to be understood that many changes and modifications may be made thereunto without departing from the spirit and scope of the invention as defined in the appended claims.

What is claimed is:

1. A rolling truck capable of being identified by a floor mounted RF reader comprising:
   a container having a top end and a bottom end and a pair of side ends, said bottom end being constructed of metal and having a plurality of castors secured thereto, and at least one brake gear secured to said bottom end;
   a plastic spacer secured to said container; and
   a transponder, secured to said spacer and responsive to said RF reader for transmitting data to the reader.

2. The rolling truck as in claim 1, wherein said spacer is secured to said bottom end of said container.

3. The rolling truck according to claim 2, wherein said spacer consists of an angle bracket having a base leg secured to said bottom end of said rolling truck, and a mounting leg extending away from said bottom end, wherein said transponder is mounted on said mounting leg.

4. The rolling truck according to claim 3, wherein said base leg is designed as a plate, and said brake gear is mounted with its mounting on said base leg.

5. The rolling truck as in claim 1, wherein said transponder is removably attached to said spacer.

6. The rolling truck as in claim 1, wherein said casters are located along two parallel opposing lines and a contact area is disposed between said casters within the two parallel opposing lines.

7. The rolling truck according to claim 1, wherein said brake gear is made of metal, and said transponder and said spacer are mounted on said metal brake gear.

8. The rolling truck according to claim 5, wherein said metal brake gear comprises two pedals which are disposed on a mounting secured to said bottom of said rolling truck, and said transponder is mounted on said mount.

9. The rolling truck according to claim 1, wherein said brake gear comprises two pedals which are arranged on a mount disposed on said bottom of said rolling truck, and said transponder is coupled to said mount.

10. The rolling truck according to claim 1, wherein said brake is made of plastic and said plastic spacer is formed by said plastic brake gear of said rolling truck.

11. The rolling truck according to claim 10 wherein said plastic brake gear comprises a pair of pedals and said transponder is mounted on one side of said pedals.

12. The rolling truck according to claim 10, wherein said plastic brake gear comprises a pair of pedals which are disposed on a mounting which is mount on said bottom end of said rolling truck and said transponder is mounted on said mounting.

13. The rolling truck according to claim 1 wherein said transponder is designed as a round disk.

14. The rolling truck according to claim 1, wherein said brake gear further comprises a pair of pedals and a mounting, wherein an opening is provided in one of the following of said spacer, or one of said pedals or of said mount, wherein the electric components of said transponder are located within said opening and said opening is filled and sealed with a casting compound.

* * * * *